United States Patent
Ryan (10) Patent No.: US 6,333,937 B1
(45) Date of Patent: Dec. 25, 2001

(54) ACCESS RETRY METHOD FOR SHARED CHANNEL WIRELESS COMMUNICATIONS LINKS

(75) Inventor: David James Ryan, Seattle, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/035,287

(22) Filed: Mar. 5, 1998

(51) Int. Cl.[7] .................................................. H04J 3/16
(52) U.S. Cl. ..................................... 370/468; 370/345
(58) Field of Search ...................................... 370/468, 445, 370/447, 280, 432, 334, 442, 480; 455/510, 528, 450, 452, 454, 525, 515–517, 574, 11.1; 375/356

(56) References Cited

U.S. PATENT DOCUMENTS

| | | | |
|---|---|---|---|
| 4,905,302 | * 2/1990 | Childress et al. | 455/515 |
| 5,117,501 | * 5/1992 | Childress et al. | 455/11.1 |
| 5,212,806 | * 5/1993 | Natarajan | 455/525 |
| 5,440,545 | * 8/1995 | Buchholz et al. | 370/442 |
| 5,533,025 | * 7/1996 | Fleek et al. | 370/480 |
| 5,862,488 | * 1/1999 | Kotzin et al. | 455/510 |
| 5,940,771 | * 8/1999 | Gollnick et al. | 455/517 |
| 5,974,310 | * 10/1999 | Bilgic | 455/418 |
| 6,014,374 | * 1/2000 | Paneth et al. | 370/345 |
| 6,052,594 | * 4/2000 | Chuang et al. | 455/450 |
| 6,085,114 | * 7/2000 | Gibbons et al. | 455/574 |
| 6,088,588 | * 7/2000 | Osborne | 455/425 |

* cited by examiner

*Primary Examiner*—Wellington Chin
*Assistant Examiner*—Prenell Jones (57) ABSTRACT

Each remote station in a wireless network cell that uses a collision oriented multiple access scheme, counts the number of retries attempted to gain access to the base station for a particular message. The accumulated value of the number of retries is then inserted in a retry count field of the access request message. After one or more retries, the base station successfully receives the access request message. The base station runs a common access channel allocation manager program that adaptively provides additional channels to the remote station, depending on the number of retries the remote station required to successfully transmit the access request message. In this manner, the base station has accurate information about the reduced performance that the remote stations suffer during an interval of high usage, to enable the base station to adaptively provide additional channels to the remote stations.

54 Claims, 7 Drawing Sheets

ACCESS RETRY METHOD FOR SHARED CHANNEL WIRELESS COMMUNICATIONS LINKS

CROSS-REFERENCE TO RELATED APPLICATIONS

The invention disclosed herein is related to the copending U.S. patent application by Dave Gibbons, Bob Maxwell, Dave Ryan entitled "OUT OF CHANNEL CYCLIC REDUNDANCY CODE METHOD FOR A DISCRETE MULTITONE SPREAD SPECTRUM COMMUNICATIONS SYSTEM", Ser. No. 08/803,831, filed Feb. 24, 1997, assigned to AT&T Wireless Services, and incorporated herein by reference.

The invention disclosed herein is related to the copending U.S. patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,510, filed on the same day as the instant patent application, now abandoned for continuation application Ser. No. 08/937,654, assigned to AT&T Wireless Services, and incorporated herein by reference.

The invention disclosed herein is related to the copending U.S. patent application by Alamouti, et al., entitled "METHOD FOR FREQUENCY DIVISION DUPLEX COMMUNICATIONS", Ser. No. 08/796,584, filed on Feb. 6, 1997, assigned to AT&T Wireless Services, and incorporated herein by reference.

The invention disclosed herein is related to the copending U.S. patent application by Paul Schachter, entitled "METHOD TO GAIN ACCESS TO A BASE STATION IN A DISCRETE MULTITONE SPREAD SPECTRUM COMMUNICATIONS SYSTEM", Ser. No. 08/806,507, filed Feb. 24, 1997, assigned to AT&T Wireless Services, and incorporated herein by reference.

The invention disclosed herein is related to the copending U.S. patent application by David Ryan, entitled "FDD FORWARD LINK BEAMFORMING METHOD FOR A FDD COMMUNICATIONS SYSTEM", Ser. No. 09/035,286 filed on Mar. 3, 1998, assigned to AT&T Wireless Services, and incorporated herein by reference.

The invention disclosed herein is related to the copending U.S. patent application by David Ryan, entitled "SYNCHRONIZATION PREAMBLE METHOD FOR OFDM WAVEFORMS IN A COMMUNICATIONS SYSTEM", Ser. No. 09/035,210 filed on Mar. 3, 1998, assigned to AT&T Wireless Services, and incorporated herein by reference.

BACKGROUND OF THE INVENTION

1. Field of the Invention

This invention involves improvements to communications systems and methods in a wireless communications system.

2. Description of Related Art

The medium access control (MAC) layer of the ISO/OSI reference model, controls the assignment of a shared transmission medium resource to transmitting stations by using an access method such as time division multiplex, frequency division multiplex, code division multiplex, and the like. In collision oriented multiple access schemes, such as Aloha and Ethernet, if a transmitting station gains access to the shared medium while another station is transmitting on the medium, the transmitted data becomes corrupted. The access method provides an orderly way for the stations to back off from their transmission and retry at a later time. In the Aloha access method, a station broadcasts its packet when ready, the sender listens to see if it collides with other packets, and if so, re-transmits after a random interval. In the Slotted Aloha access method, packets are constrained to start at the beginning of a time slot, the sender listens to see if it collides with other packets, and if so, re-transmits after a random interval, in a later time slot. In Carrier Sense Multiple Access/Collision Detect (CSMA/CD) access methods, such as Ethernet, a transmitting station waits until the medium is quiet before starting to transmit and then continues to listen while transmitting. If two stations transmit during the same interval, both stations detect this and continue to transmit for a certain length of time to ensure that all stations on the medium detect the collision. The transmitting stations then wait for a random interval before attempting to transmit again. Details of the Ethernet access method are provided in the book by Hegering and Lapple, entitled "Ethernet, Building a Communications Infrastructure", Addison-Wesley, 1993. In all applications of multiple access methods, design engineers try to estimate the maximum number of stations that will attempt to gain access to the shared medium in an average interval and then provide a sufficient number of time domain channels, frequency domain channels, or code domain channels, for example, to accommodate those stations.

In wireless communications, the medium is defined by a cell region occupied by a base station that serves a number of remote stations. At least some classes of messages between the remote stations and the base station, such as channel access requests or transmission control messages, employ collision oriented multiple access schemes to gain access to the shared medium, in order to conserve the radio spectrum. When a remote station wishes to request a session with the base station, it uses a collision oriented multiple access scheme. In a crowded interval when two or more remote stations attempt to access the base station, if the base station detects that a collision has occurred on the shared access channel, it can respond by broadcasting a negative acknowledgement (NACK) signal. Many times, however, the base station does not detect that a collision has occurred among requesting remote stations. Alternately, if the remote stations detect that a collision has occurred, they can back off and retry at a later time. But, in either case, it is difficult for the base station to quantitatively assess the reduced performance that the remote stations suffer during the interval of high usage.

What is needed is some way for the base station to have accurate information about the reduced performance that the remote stations suffer during an interval of high usage, to enable the base station to adaptively provide additional channels to the remote stations.

SUMMARY OF THE INVENTION

In accordance with the invention, each remote station in a wireless network cell that uses a collision oriented multiple access scheme, counts the number of retries attempted to gain access to the base station for a particular message. When a remote station attempts to transmit an access request message over a common access channel, it can determine that its message has failed in several ways. If the base station detects that a collision has occurred on the common access channel, it can respond by broadcasting a negative acknowledgement (NACK) signal. Alternately, the remote station can detect that a collision has occurred. As another alternative, another remote station in the same cell can detect that a collision has occurred, and relays that information back to the first remote station through the base station. The remote, having failed in its attempt to successfully transmit its access request message the base station, will have to retry the access under the collision oriented multiple access scheme. The remote station accumulates the count of its retries for a particular access request message, in a retry count register. The accumulated value of the number of retries in the register is then inserted in a retry count field of the access request message. The retry count field is a medium access control (MAC) layer field of the ISO/OSI reference model.

After one or more retries, the base station successfully receives the access request message. The base station strips off the retry count field as part of the normal MAC layer protocol processing. The base station runs a common access channel allocation manager program that adaptively provides additional channels to the remote station, depending on the number of retries the remote station required to successfully transmit the access request message. The base station maintains an allocation table that relates the retry count value extracted from the retry field, and the corresponding level of service or channel capacity that is required for a given probability that an access request will be successful on the first try. In response to the retry count value extracted from the retry field exceeding a given threshold, the common access channel allocation manager program adaptively provides additional channels to the remote station. In a time division multiplex access method, the common access channel allocation manager program adaptively provides alternate time slots. In a frequency division multiplex access method, the common access channel allocation manager program adaptively provides alternate frequency carriers. In a code division multiplex access method, the common access channel allocation manager program adaptively provides alternate codes. In an orthogonal frequency division multiplex (OFDM) wireless access method where the waveform is composed of many closely spaced frequency carriers, each carrying a single complex (magnitude and phase) symbols, the common access channel allocation manager program adaptively provides an alternate set of closely spaced frequency carriers.

In this manner, the base station has accurate information about the reduced performance that the remote stations suffer during an interval of high usage, to enable the base station to adaptively provide additional channels to the remote stations.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

DISCUSSION OF THE PREFERRED EMBODIMENT

Adaptive beamforming technology has become a promising technology for wireless service providers to offer large coverage, high capacity, and high quality service. Based on this technology, a wireless communication system can improve its coverage capability, system capacity, and performance significantly.

The personal wireless access network (PWAN) system described in the referenced Alamouti, Stolarz, et al. patent application, uses adaptive beamforming combined with a form of the CDMA protocol known as discrete multitone spread spectrum (DMT-SS) to provide efficient communications between a base station and a plurality of remote units (RU).

An orthogonal frequency division multiplex (OFDM) waveform is composed of many closely spaced carriers, each carrying a single complex (magnitude and phase) symbol. The OFDM carriers are chosen such that the lowest frequency carrier's period is entirely the symbol time duration and each succesive carrier is an integer multiple of that frequency. Prior to transmission, the composite signal consisting of multiple orthogonally spaced tones each carrying a single information symbol, is converted into the time domain via an inverse fast Fourier transform (FFT) and transmitted as a complex time domain waveform with a symbol duration as defined above $$\left(\frac{1}{\Delta f_{carrier}}\right).$$

Since each carrier (referred to as tone) is modulated by an individual symbol from a users data, the phases are random. This condition can be assured with data scrambling or pre whitening techniques to assure random phase (and possibly amplitude) distribution during idle data streams. The time domain transmitted waveform is thus very noiselike with a peak to average ratio determined by the number of tones and their randomness. Additional discussion of OFDM principles can be found in the book by Rappaport, "Wireless Communications", Prentice Hall, 1996.

Figure 1:
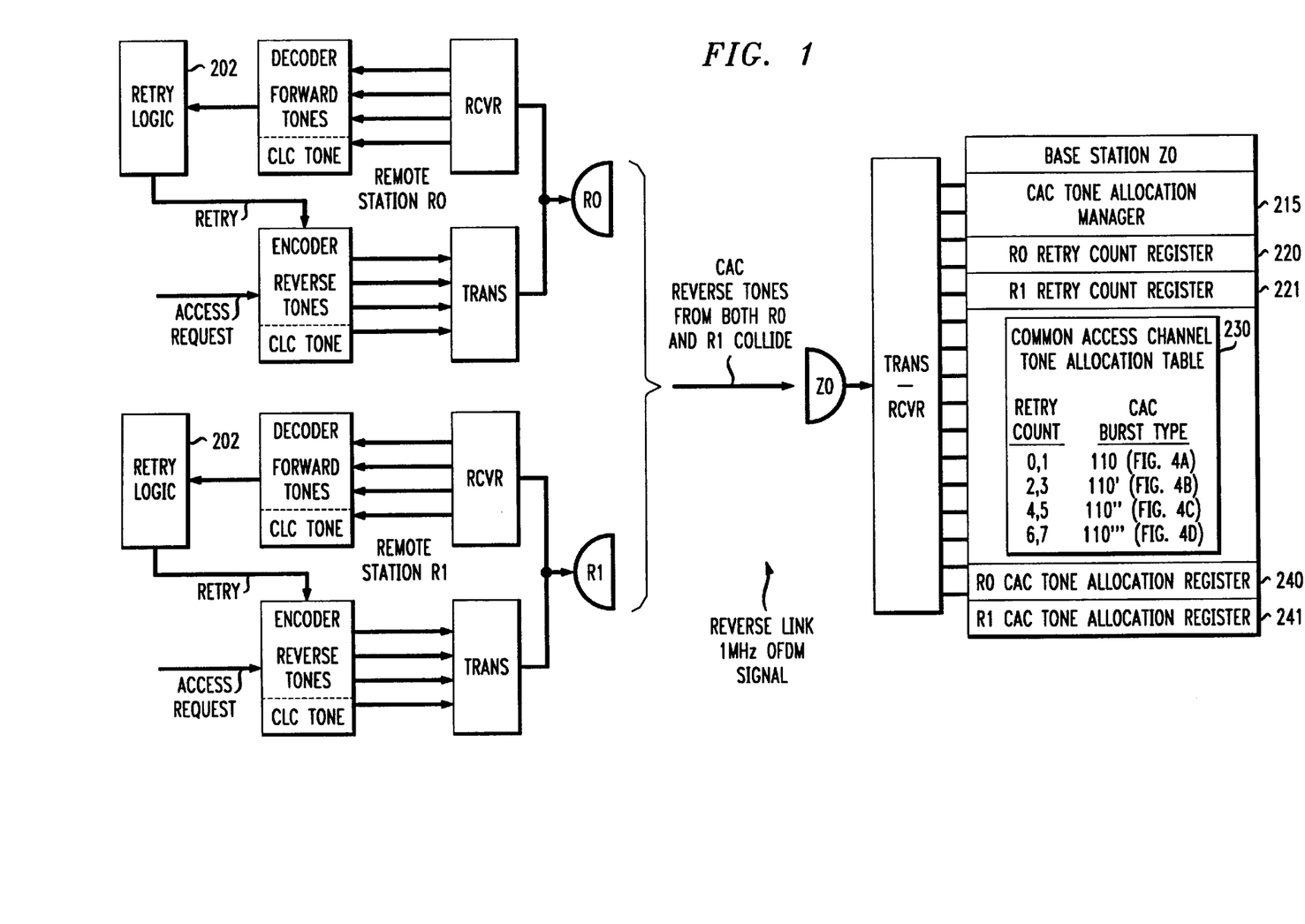
FIG. 1 shows two remote stations, R0 and R1, simultaneously transmitting access request messages to a base station Z0 in a wireless network cell that uses a collision oriented multiple access scheme. Their messages collide and as a result, the access scheme requires that they retry sending the messages.
Figure 3:
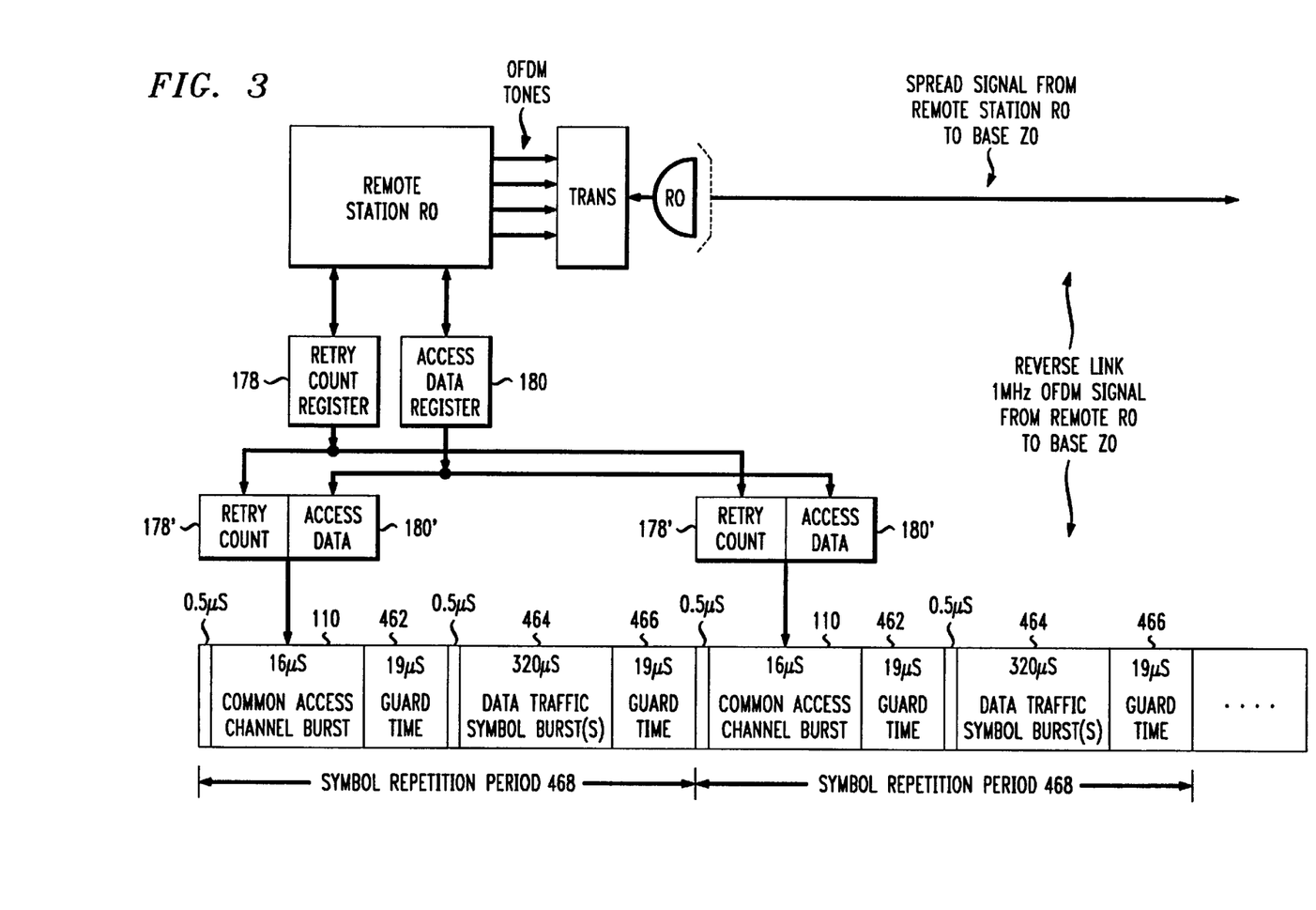
FIG. 3 shows the remote stations R0 transmitting a retry count value on the reverse link back to the base station Z0, where the base station derives channel allocation information for the remote station based on the retry count value.
Figure 4A:
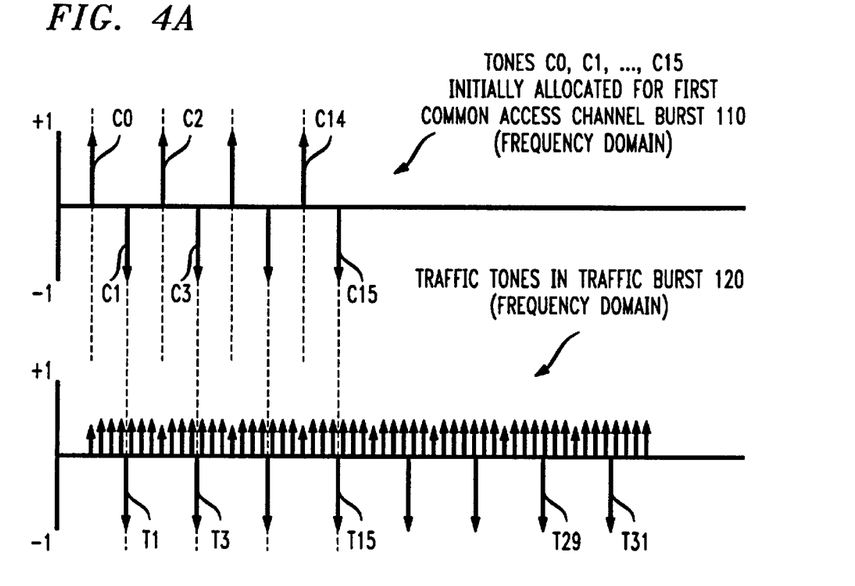
FIG. 4A shows a first channel allocation for the remote station.

FIG. 1 shows two remote stations, R0 and R1, simultaneously transmitting access request messages 110 to a base station Z0 in a wireless network cell that uses a collision oriented multiple access scheme. The access request messages 110 are composed of orthogonal frequency division multiplex (OFDM) carriers, each carrying a single complex (magnitude and phase) symbol, as shown in FIG. 4A. The reverse link, from the remote stations to the base station, carries a periodic frame comprising a 1 MHz OFDM signal, as shown in FIG. 3. The periodic frame, has a symbol repetition period 468, and includes a first field for the 16 microsecond common access channel (CAC) burst 110, followed by a second field for a 19 microsecond guard time 462, followed by a third field for a 320 microsecond data traffic symbol burst 464, followed by a fourth field for another 19 microsecond guard time 466. During the first 16 microsecond interval in the symbol repetition period 468, any remote station such as R0 and R1 in FIG. 1, can contend for access to the base station Z0 using a collision oriented multiple access scheme. It is during this period that collisions occur between two or more access request messages on the common access channel. The third field in the symbol repetition period 468 of FIG. 3 is the 320 microsecond time slot for the data traffic symbol burst 464 in FIG. 3. During this interval, one or more remote stations, such as R0 and R1, are allocated exclusive sets of OFDM carriers in a traffic burst 120 sent to the base station Z0, as shown in FIG. 4A.

Each remote station R0 or R1 in FIG. 1, includes an antenna and a receiver (RCVR) connected to a decoder for decoding forward traffic OFDM frequency tones in traffic bursts from the base station Z0 and control link channel (CLC) OFDM frequency tones from the base station. If the remote station detects that a collision has occurred on the common access channel for an access request message it sent during a previous reverse link symbol repetition period 468, the decoder passes this information to the retry logic 202, shown in greater detail in FIG. 2. Because a collision has been detected, the access scheme requires that R0 retry sending the access request message. Each remote station counts the number of retries attempted to gain access to the base station for a particular message.

Each remote station R0 or R1 in FIG. 1, includes an encoder and a transmitter (TRANS) connected to its antenna, for encoding reverse traffic OFDM frequency tones T1 through T31 in traffic bursts 120 shown in FIG. 4A to the base station Z0. The encoder also encodes the access request messages 110 to the base station Z0, comprised of reverse OFDM frequency tones C0 through C15 in first type CAC bursts 110 shown in FIG. 4A. If the remote station R0 has detected that a collision has occurred on the common access channel for an access request message it sent during a previous reverse link symbol repetition period 468, the retry logic 202 of FIG. 2 updates a retry count value in its retry count register 178. The retry logic 202 passes the retry count value to the encoder. The accumulated value of the number of retries in the register 178 is then inserted in a retry count field 178' of the access request message, as shown in FIG. 3. The retry count field 178' is a medium access control (MAC) layer field of the ISO/OSI reference model. Details of the medium access control (MAC) layer field of the ISO/OSI reference model are provided in the book by Hegering and Lapple, entitled "Ethernet, Building a Communications Infrastructure", Addison-Wesley, 1993. Access data 180' is also included in the access request message of FIG. 3, such as the identity of the remote station R0 and the type of service requested.

When a remote station attempts to transmit an access request message over a common access channel, it can determine that its message has failed in several ways. If the base station detects that a collision has occurred on the common access channel, it can respond by broadcasting a negative acknowledgement (NACK) signal. Alternately, the remote station can detect that a collision has occurred. As another alternative, another remote station in the same cell can detect that a collision has occurred, and relays that information back to the first remote station through the base station.

Figure 4B:
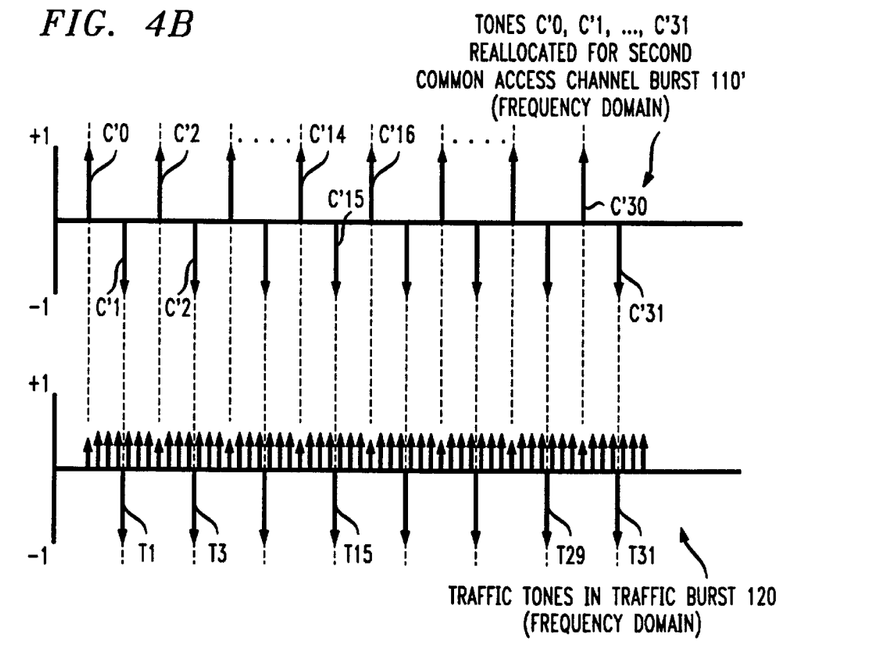
FIG. 4B shows a second channel allocation for the remote station.

After one or more retries, the base station Z0 in FIG. 1, successfully receives the access request message from remote station R0. The base station Z0 strips off the retry count field 178' as part of the normal MAC layer protocol processing. The base station Z0 runs a common access channel (CAC) tone allocation manager program 215 that adaptively provides additional channels to the remote station R0, depending on the number of retries the remote station R0 required to successfully transmit the access request message. The base station stores the retry count value received the retry count field 178', in a R0 retry count register 220. Another similar register 221 in the base station stores the retry count value received the retry count field 178' from the second remote station R1. The base station Z0 maintains a common access channel tone allocation table 230 that relates the retry count value extracted from the retry field 178', and the corresponding level of service or channel capacity that is required for a given probability that an access request will be successful on the first try. The channel capacity is expressed as the CAC burst type. Several alternative patterns of orthogonal frequency division multiplex (OFDM) carriers, for the CAC burst types 110, 110', 110", and 110'" are respectively shown in FIGS. 4A, 4B, 4C, and 4D. Each burst type is composed of OFDM frequencies, each carrying a single complex (magnitude and phase) symbol. The CAC burst types 110, 110', 110", and 110'" are shown in the frequency domain, positioned relative to the OFDM frequencies of the traffic burst 120. FIG. 4A shows a first channel allocation CAC burst 110 of 16 tones C0 to C15 for the remote station, for a retry count value of zero or one. FIG. 4B shows a second channel allocation CAC burst 110' of 32 tones C'0 to C'31 for the remote station, for a retry count value of two or three.

Figure 4C:
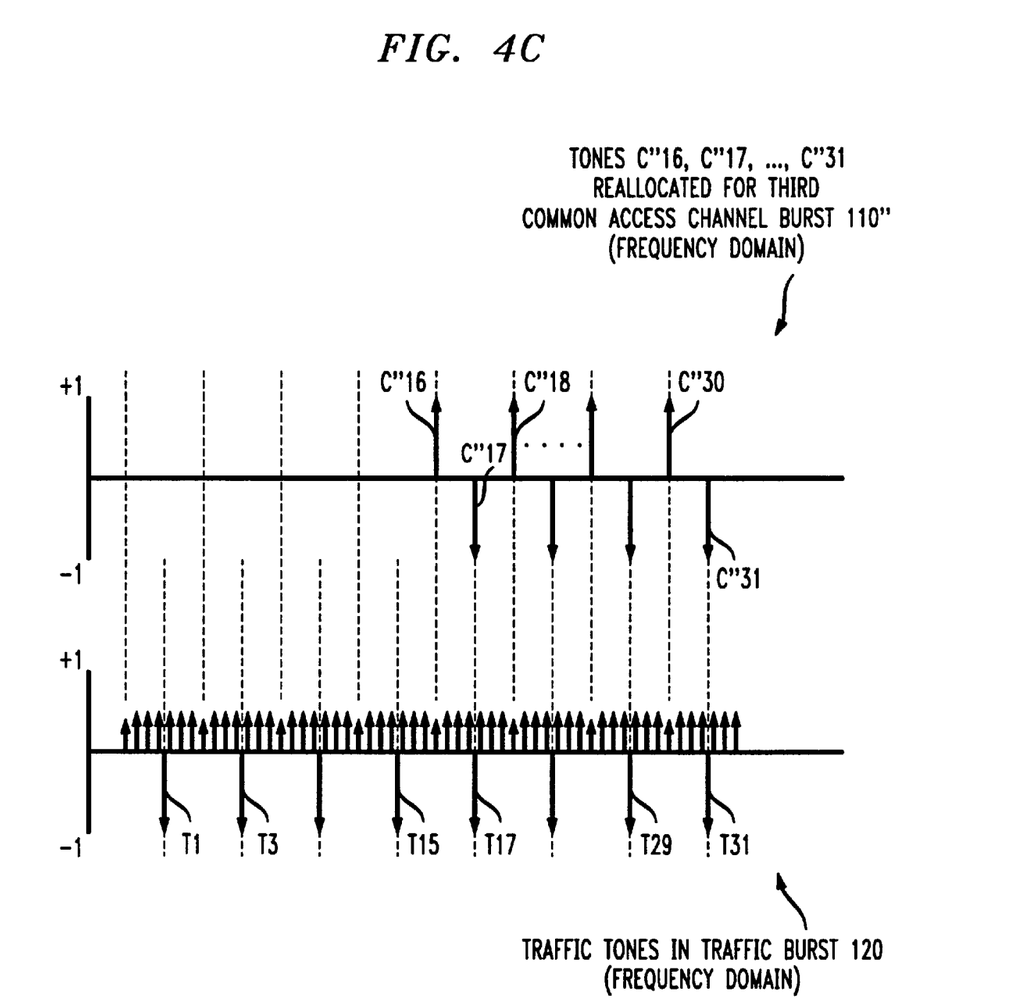
FIG. 4C shows a third channel allocation for the remote station.
Figure 4D:
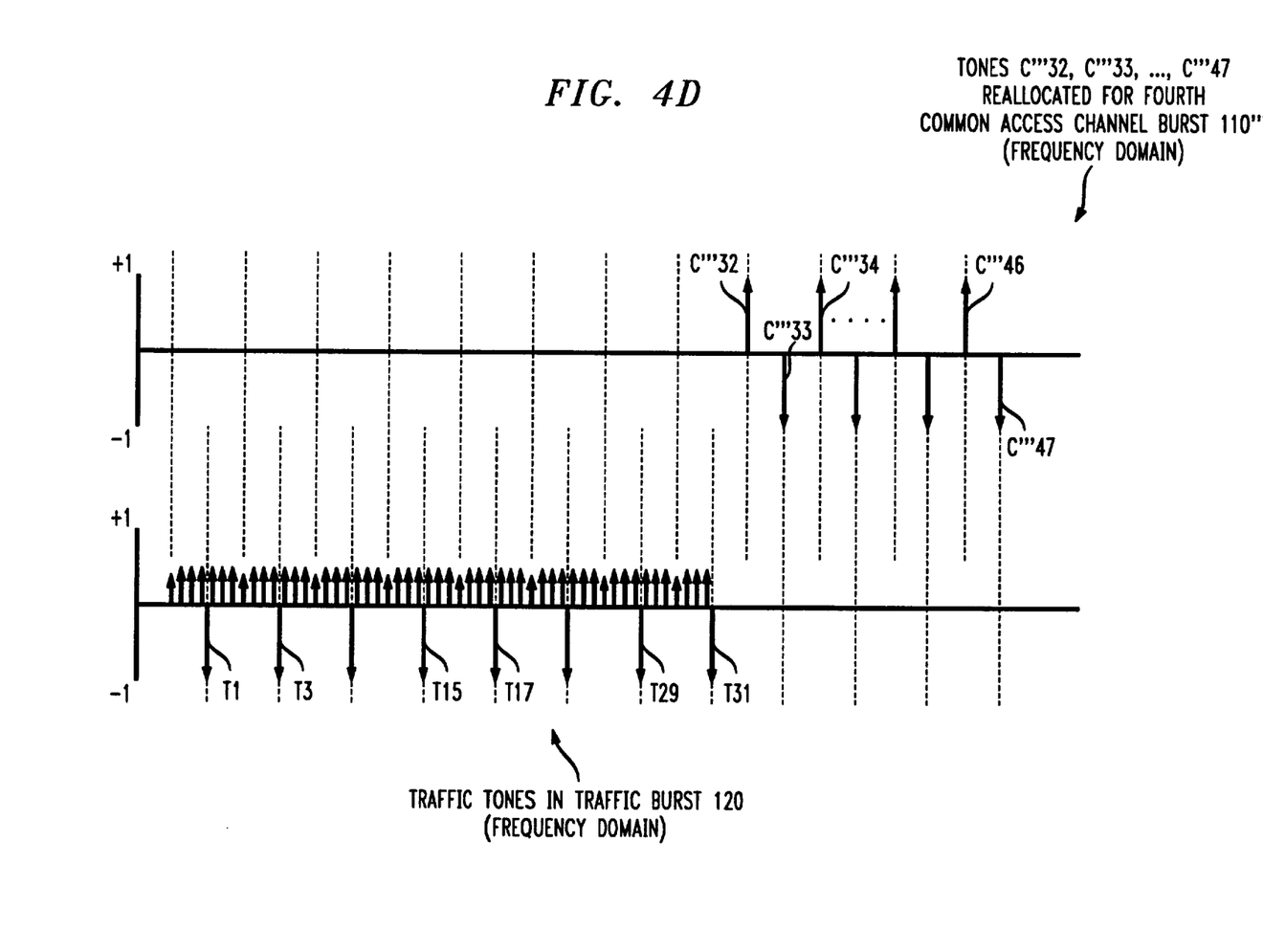
FIG. 4D shows a fourth channel allocation for the remote station.

FIG. 4C shows a third channel allocation CAC burst 110" of 16 tones C"16 to C"31 for the remote station, for a retry count value of four or five. FIG. 4D shows a fourth channel allocation CAC burst 110'" of 16 tones C'"32 to C'"47 for the remote station, for a retry count value of six or seven. Each of these alternative CAC burst types 110, 110', 110", and 110'" can be selected by the CAC tone allocation manager 215 in response to the received value of the retry count in the retry count field 178'. The selected one of these alternative CAC burst types 110, 110', 110", or 110'", selected for the remote station R0, is identified by a burst type value that is stored in the R0 CAC tone allocation register 240 in the base station Z0. A similar register 241 stores a burst type value selected for the second remote station R1.

I alternate embodiments of the invention, in response to the retry count value extracted from the retry field exceeding a given threshold, the common access channel allocation manager program adaptively provides additional channels to the remote station. In a time division multiplex access method, the common access channel allocation manager program adaptively provides alternate time slots. In a frequency division multiplex access method, the common access channel allocation manager program adaptively provides alternate frequency carriers. In a code division multiplex access method, the common access channel allocation manager program adaptively provides alternate codes.

Figure 2:
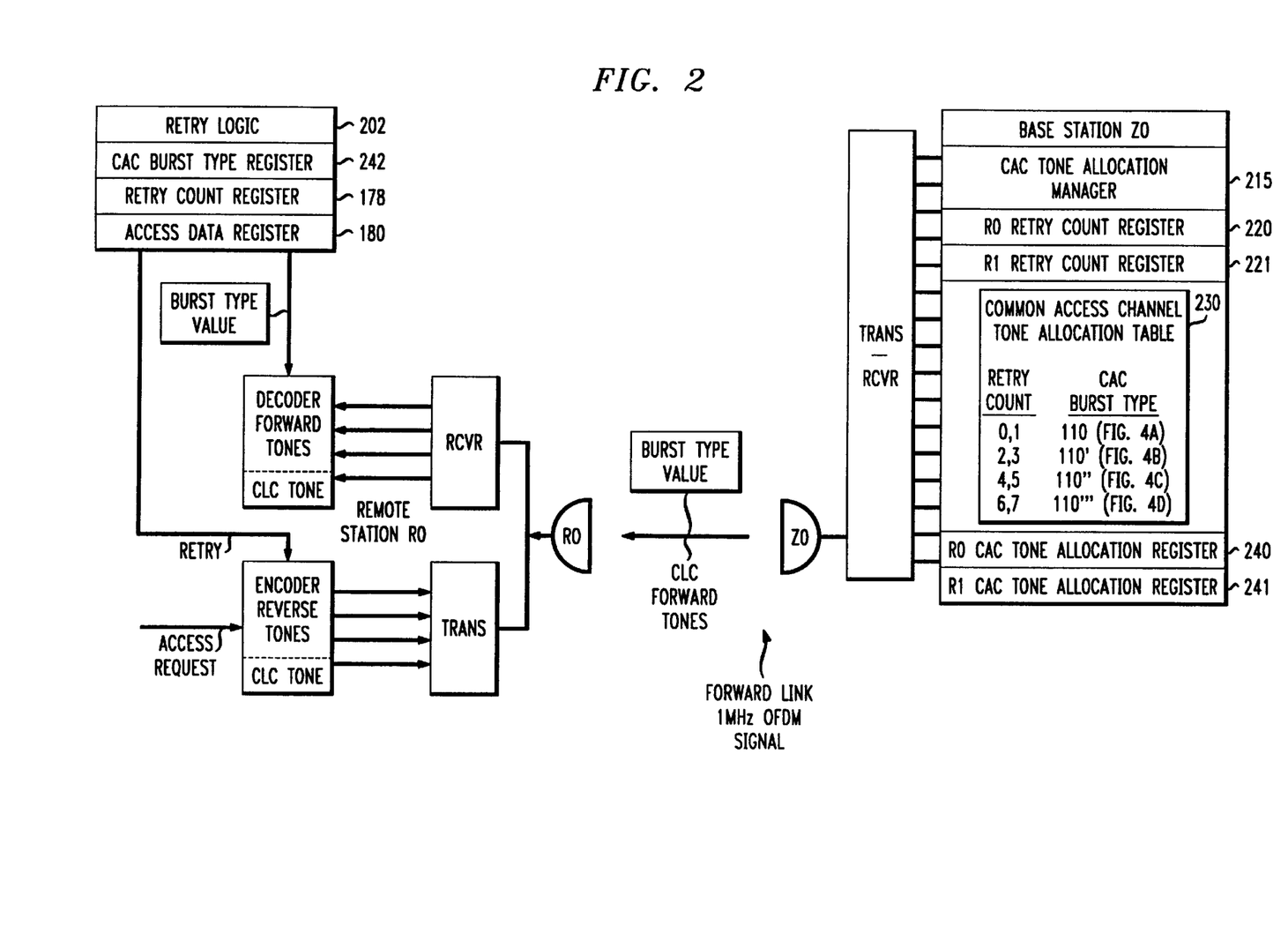
FIG. 2 shows the base station Z0 transmitting back of a remote station R0 a burst type value on the forward link, that specifies a new allocation of channel capacity to the remote station.

FIG. 2 shows the base station Z0 transmitting back of a remote station R0 a burst type value on the forward link, that specifies a new allocation of channel capacity to the remote station. This burst type value is stored in the CAC burst type register 242 of the remote station R0. In response, the retry logic 202 specifies to the encoder in R0, which of the alternative patterns of orthogonal frequency division multiplex (OFDM) carriers, for the CAC burst types 110, 110', 110", and 110''' are respectively shown in FIGS. 4A, 4B, 4C, and 4D, are to be transmitted on the reverse link in the next symbol repetition period 468.

Figure 5:
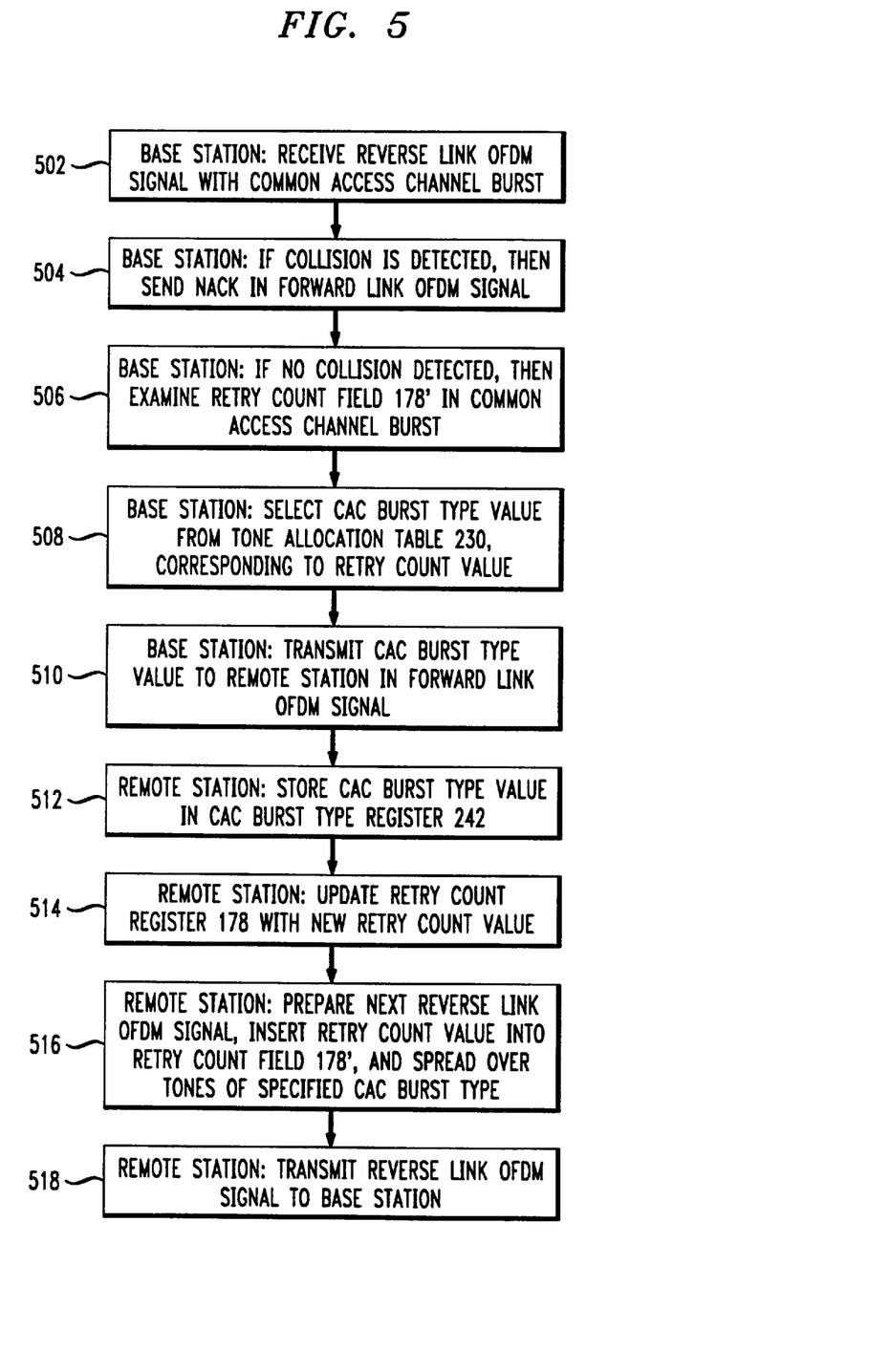
FIG. 5 is a flow diagram of the overall operation of the base station and remote station to provide a new channel allocation for the remote station, in accordance with the invention.

FIG. 5 is a flow diagram of the overall operation of the base station and remote station to provide a new channel allocation for the remote station, in accordance with the invention. In step 502, the base station receives a reverse link OFDM signal with a common access channel burst. In step 504, the base station determines if a collision is detected, and if so, then sends back a NACK in the forward link OFDM signal. In step 506, the base station does not sense a collision, then it examines the retry count field 178' in the common access channel burst. In step 508, the base station selects the CAC burst type value from the tone allocation table 230, corresponding to the retry count value. In step 510, the base station transmits the CAC burst type value to the remote station in the forward link OFDM signal. In step 512, the remote station stores the CAC burst type value in the CAC burst type register 242. In step 514, the remote station updates the retry count register 178 with a new retry count value. In step 516, the remote station prepares the next reverse link OFDM signal, inserts the retry count value into the retry count field 178', and spreads the signal over the tones specified by the CAC burst type. In step 518, the remote station transmits the reverse link OFDM signal to the base station.

In this manner, the base station has accurate information about the reduced performance that the remote stations suffer during an interval of high usage, to enable the base station to adaptively provide additional channels to the remote stations.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. In a wireless network with remote stations that use a collision oriented multiple access scheme to access a base station, a method to enable the base station to adaptively provide additional channels to the remote stations during an interval of high usage, comprising:

counting a number of retries attempted by a remote station to access the base station, as a count value;

inserting said count value in a retry count field of an access request message;

transmitting said access request message to the base station; and adaptively providing with the base station additional channels to the remote station, depending on said number of retries attempted by said remote station to access to said base station.

2. The method of claim 1, which further comprises:

maintaining at said base station an allocation table that relates said retry count value and a corresponding channel capacity allocation.

3. The method of claim 1, which further comprises:

maintaining at said base station an allocation algorithm that relates said retry count value and a corresponding channel capacity allocation.

4. The method of claim 1, which further comprises:

said adaptively providing step being in response to said retry count value exceeding a given threshold value.

5. The method of claim 1, which further comprises:

detecting at said base station that a collision has occurred on a common access channel used by said remote station and broadcasting a signal in response thereto, enabling said remote station to perform said counting step.

6. The method of claim 1, which further comprises:

detecting at said remote station that a collision has occurred on a common access channel used by said remote station, enabling said remote station to perform said counting step.

7. The method of claim 1, which further comprises:

said adaptively providing step providing alternate time slots in a time division multiplex access method.

8. The method of claim 1, which further comprises:

said adaptively providing step providing alternate frequency carriers in a frequency division multiplex access method.

9. The method of claim 1, which further comprises:

said adaptively providing step providing alternate codes in a code division multiplex access method.

10. The method of claim 1, which further comprises:

said adaptively providing step providing an alternate set of closely spaced frequency carriers in an orthogonal frequency division multiplex (OFDM) wireless access method.

11. The method of claim 1, which further comprises:

said retry count field is a medium access control (MAC) layer field of an ISO/OSI reference model.

12. In a wireless network with remote stations that use a collision oriented multiple access scheme to access a base station, a system to enable the base station to adaptively provide additional channels to the remote stations during an interval of high usage, comprising:

means for counting a number of retries attempted by a remote station to access the base station, as a count value;

means for inserting said count value in a retry count field of an access request message;

means for transmitting said access request message to the base station; and means for adaptively providing with the base station additional channels to the remote station, depending on said number of retries attempted by said remote station to access to said base station.

13. The system of claim 12, which further comprises:

means for maintaining at said base station an allocation table that relates said retry count value and a corresponding channel capacity allocation.

14. The system of claim 12, which further comprises:

means for maintaining at said base station an allocation algorithm that relates said retry count value and a corresponding channel capacity allocation.

15. The system of claim 12, which further comprises:

said adaptively providing means operating in response to said retry count value exceeding a given threshold value.

16. The system of claim 12, which further comprises:

means for detecting at said base station that a collision has occurred on a common access channel used by said remote station and broadcasting a signal in response thereto, enabling said remote station to perform said counting.

17. The system of claim 12, which further comprises:

means for detecting at said remote station that a collision has occurred on a common access channel used by said remote station, enabling said remote station to perform said counting.

18. The system of claim 12, which further comprises:

said adaptively providing means providing alternate time slots in a time division multiplex access system.

19. The system of claim 12, which further comprises:

said adaptively providing means providing alternate frequency carriers in a frequency division multiplex access system.

20. The system of claim 12, which further comprises:

said adaptively providing means providing alternate codes in a code division multiplex access system.

21. The system of claim 12, which further comprises:

said adaptively providing means providing an alternate set of closely spaced frequency carriers in an orthogonal frequency division multiplex (OFDM) wireless access system.

22. The system of claim 12, which further comprises:

said retry count field is a medium access control (MAC) layer field of an ISO/OSI reference model.

23. In a network with client stations that use a collision oriented multiple access scheme to access a server station, a method to enable the server station to adaptively provide additional channels to the client stations during an interval of high usage, comprising:

counting a number of retries attempted by a client station to access the server station, as a count value;

inserting said count value in a retry count field of an access request message;

transmitting said access request message to the server station; and adaptively providing with the server station additional channels to the client station, depending on said number of retries attempted by said client station to access to said server station.

24. The method of claim 23, which further comprises:

maintaining at said server station an allocation table that relates said retry count value and a corresponding channel capacity allocation.

25. The method of claim 23, which further comprises:

maintaining at said server station an allocation algorithm that relates said retry count value and a corresponding channel capacity allocation.

26. The method of claim 24, which further comprises:

said adaptively providing step being in response to said retry count value exceeding a given threshold value.

27. In a network with client stations that use a collision oriented multiple access scheme to access a server station, a system to enable the server station to adaptively provide additional channels to the client stations during an interval of high usage, comprising:

means for counting a number of retries attempted by a client station to access the server station, as a count value;

means for inserting said count value in a retry count field of an access request message;

means for transmitting said access request message to the server station; and means for adaptively providing with the server station additional channels to the client station, depending on said number of retries attempted by said client station to access to said server station.

28. The system of claim 27, which further comprises:

means for maintaining at said server station an allocation table that relates said retry count value and a corresponding channel capacity allocation.

29. The system of claim 27, which further comprises:

means for maintaining at said server station an allocation algorithm that relates said retry count value and a corresponding channel capacity allocation.

30. The system of claim 27, which further comprises:

said means for adaptively providing operating in response to said retry count value exceeding a given threshold value.

31. In a wireless network with remote stations that use a collision oriented multiple access scheme to access a base station, a method to adaptively provide additional channels to the remote stations during an interval of high usage, comprising:

counting a number of retries attempted by a remote station to access the base station, as a count value;

inserting said count value in a retry count field of an access request message;

transmitting said access request message to the base station;

receiving an indication from the base station that additional channels are available to the remote station, in response to said count value; and transmitting messages from said remote station to said base station using said additional channels.

32. The method of claim 31, which further comprises:

detecting at said remote station that a collision has occurred on a common access channel used by said remote station, enabling said remote station to perform said counting step.

33. The method of claim 31, which further comprises:

said additional channels being alternate time slots in a time division multiplex access method.

34. The method of claim 31, which further comprises:

said additional channels being alternate frequency carriers in a frequency division multiplex access method.

35. The method of claim 31, which further comprises:

said additional channels being alternate codes in a code division multiplex access method.

36. The method of claim 31, which further comprises:

said additional channels being alternate set of closely spaced frequency carriers in an orthogonal frequency division multiplex (OFDM) wireless access method.

37. The method of claim 31, which further comprises:

said retry count field is a medium access control (MAC) layer field of an ISO/OSI reference model.

38. In a wireless network with remote stations that use a collision oriented multiple access scheme to access a base station, a system to adaptively provide additional channels to the remote stations during an interval of high usage, comprising:

means for counting a number of retries attempted by a remote station to access the base station, as a count value;

means for inserting said count value in a retry count field of an access request message;

means for transmitting said access request message to the base station;

means for receiving an indication from the base station that additional channels are available to the remote station, in response to said count value; and means for transmitting messages from said remote station to said base station using said additional channels.

39. The system of claim 38, which further comprises:

means for detecting at said remote station that a collision has occurred on a common access channel used by said remote station, enabling said remote station to perform said counting step.

40. The system of claim 38, which further comprises:

said additional channels being alternate time slots in a time division multiplex access system.

41. The system of claim 38, which further comprises:

said additional channels being alternate frequency carriers in a frequency division multiplex access system.

42. The system of claim 38, which further comprises:

said additional channels being alternate codes in a code division multiplex access system.

43. The system of claim 38, which further comprises:

said additional channels being alternate set of closely spaced frequency carriers in an orthogonal frequency division multiplex (OFDM) wireless access system.

44. The system of claim 38, which further comprises:

said retry count field is a medium access control (MAC) layer field of an ISO/OSI reference model.

45. In a network including a plurality of remote stations that use a collision oriented multiple access scheme to gain access to a base station, a method at the base station comprising:

receiving at the base station an access request message from a remote station after at least one retry attempt by the remote station, the message including a retry count field of the number of attempted retries;

stripping off the retry count field from the access request message at the base station;

running a channel allocation program at the base station that adaptively provides additional channels to the remote station, depending on the number of retries the remote station attempted to successfully transmit the access request message;

maintaining an allocation table at the base station that relates the retry count value extracted from the retry field, to a corresponding channel capacity required for a given probability that an access request will be successful on a first try; and providing additional channels to the remote station by said base station, in response to the retry count value extracted from the retry field exceeding a given threshold;

whereby the base station has accurate information about the reduced performance that the remote stations suffer during an interval of high usage, to enable the base station to adaptively provide additional channels to the remote stations.

46. The method of claim 45, which further comprises:

detecting at said base station that a collision has occurred on a common access channel used by said remote station and broadcasting a signal in response thereto, enabling said remote station to count attempted retries.

47. The method of claim 45, which further comprises:

said providing step providing alternate time slots in a time division multiplex access method.

48. The method of claim 45, which further comprises:

said providing step providing alternate frequency carriers in a frequency division multiplex access method.

49. The method of claim 45, which further comprises:

said providing step providing alternate codes in a code division multiplex access method.

50. The method of claim 45, which further comprises:

said providing step providing an alternate set of closely spaced frequency carriers in an orthogonal frequency division multiplex (OFDM) wireless access method.

51. In a network including a plurality of stations that use a multiple access scheme to gain access to another station, a method comprising:

receiving at a first station an access request message from a second station after at least one retry attempt by the second station, the message including a retry count value of the number of attempted retries; and adaptively providing additional channels to the second station, depending on the number of retries the second station attempted to successfully transmit the access request message on response to the retry count value exceeding a given threshold.

52. In a network including a plurality of stations that use a multiple access scheme to gain access to another station, a method comprising:

receiving at a first station an access request message from a second station after at least one retry attempt by the second station, the message including a retry count value of the number of attempted retries;

relating the retry count value to a corresponding channel capacity required for a given probability that an access request will be successful on a first try; and adaptively providing additional channels to the second station, depending on the number of retries the second station attempted to successfully transmit the access request message, in response to the retry count value exceeding a given threshold.

53. In a network including a plurality of stations that use a multiple access scheme to gain access to another station, a method comprising:

receiving at a first station an access request message from a second station after at least one retry attempt by the second station, the message including a retry count value of the number of attempted retries;

adaptively providing additional channels to the second station, depending on the number of retries the second station attempted to successfully transmit the access request message;

relating the retry count value to a corresponding channel capacity required for a given probability that an access request will be successful on a first try; and providing additional channels to the second station, in response to the retry count value exceeding a given threshold.

54. In a network including a plurality of stations that use a multiple access scheme to gain access to another station, a method comprising:

receiving at a first station an access request message from a second station after at least one retry attempt by the second station, the message including a retry count value of the number of attempted retries;

running a channel allocation program at the first station that adaptively provides additional channels to the second station, depending on the number of retries the second station attempted to successfully transmit the access request message;

maintaining an allocation table at the first station that relates the retry count value extracted from the retry field, to a corresponding channel capacity required for a given probability that an access request will be successful on a first try; and providing additional channels to the second station by said first station, in response to the retry count value extracted from the retry field exceeding a given threshold;

whereby the first station has accurate information about the reduced performance that the second station suffers during an interval of high usage, to enable the first station to adaptively provide additional channels to the second station.

* * * * *

UNITED STATES PATENT AND TRADEMARK OFFICE
CERTIFICATE OF CORRECTION

PATENT NO.   : 6,333,937 B1
DATED        : December 25, 2001
INVENTOR(S)  : Ryan It is certified that error appears in the above-identified patent and that said Letters Patent is hereby corrected as shown below:

<u>Column 4,</u>
Line 39, "succesive" should be -- successive --;

<u>Column 12,</u>
Line 19, "on" should be -- in --;

Signed and Sealed this

Fourth Day of June, 2002

Attest:

JAMES E. ROGAN
Attesting Officer   Director of the United States Patent and Trademark Office